US011511280B2

(12) United States Patent
Groussin et al.

(10) Patent No.: US 11,511,280 B2
(45) Date of Patent: Nov. 29, 2022

(54) DOUBLE BAG FOR AUTOMATED ANALYSIS DEVICE

(71) Applicant: DIAGNOSTICA STAGO, Asnieres-sur-Seine (FR)

(72) Inventors: Eric Groussin, Osny (FR); Vincent Moutier, Levallois-Perret (FR)

(73) Assignee: DIAGNOSTICA STAGO, Asnieres-sur-Seine (FR)

(*) Notice: Subject to any disclaimer, the term of this patent is extended or adjusted under 35 U.S.C. 154(b) by 422 days.

(21) Appl. No.: 16/043,275

(22) Filed: Jul. 24, 2018

(65) Prior Publication Data

US 2019/0030541 A1 Jan. 31, 2019

(30) Foreign Application Priority Data

Jul. 25, 2017 (FR) ...................................... 1757079

(51) Int. Cl.
| | |
|---|---|
| *B01L 3/00* | (2006.01) |
| *G01N 35/00* | (2006.01) |
| *B65D 77/06* | (2006.01) |
| *G01N 35/10* | (2006.01) |
| *G01N 35/04* | (2006.01) |

(52) U.S. Cl.
CPC ..................... *B01L 3/56* (2013.01); *B01L 3/52* (2013.01); *B01L 3/523* (2013.01); *B65D 77/06* (2013.01); *G01N 35/0092* (2013.01); *G01N 35/10* (2013.01); *G01N 35/1004* (2013.01); *B01L 2200/026* (2013.01); *B01L 2200/12* (2013.01); *B01L 2300/123* (2013.01); *G01N 2035/0436* (2013.01); *G01N 2035/0437* (2013.01); *G01N 2035/0498* (2013.01)

(58) Field of Classification Search
None
See application file for complete search history.

(56) References Cited

U.S. PATENT DOCUMENTS

| | | | | |
|---|---|---|---|---|
| 3,616,991 | A | * 11/1971 | Beck | ...................... B65D 75/30 |
| | | | | 206/484 |
| 3,749,620 | A | 7/1973 | Montgomery | |
| 4,548,606 | A | 10/1985 | Larkin | |
| 4,588,554 | A | 5/1986 | Kaartinen et al. | |
| 4,791,013 | A | * 12/1988 | Koboshi | ................ G03C 5/267 |
| | | | | 215/6 |

(Continued)

FOREIGN PATENT DOCUMENTS

| | | |
|---|---|---|
| EP | 2 466 316 A1 | 6/2012 |
| JP | 08-105900 A | 4/1996 |

(Continued)

OTHER PUBLICATIONS

French Preliminary Search Report dated Jun. 13, 2018 for corresponding French Application No. 1757879.

(Continued)

*Primary Examiner* — P. Kathryn Wright
(74) *Attorney, Agent, or Firm* — Pearne & Gordon LLP

(57) ABSTRACT

Double bag having a first compartment containing a composition to be distributed and a second compartment for receiving a used fluid, a first bag connector communicating with the first compartment and serving to empty the latter, and a second bag connector communicating with the second compartment and serving to fill the latter.

12 Claims, 5 Drawing Sheets

(56) References Cited

U.S. PATENT DOCUMENTS

Figure 1:
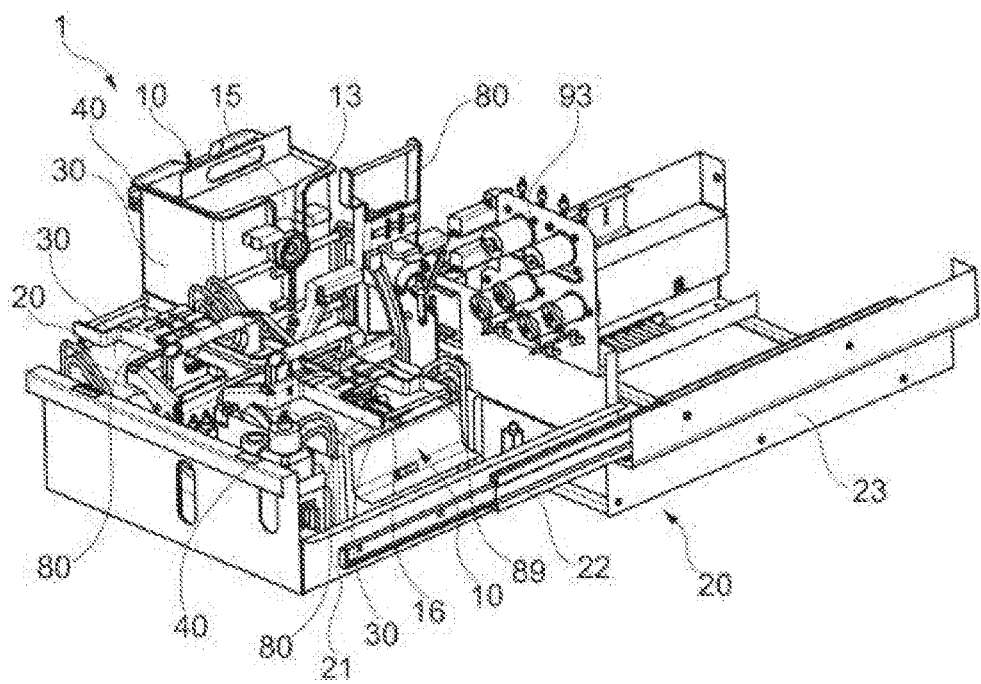
Figure 2:
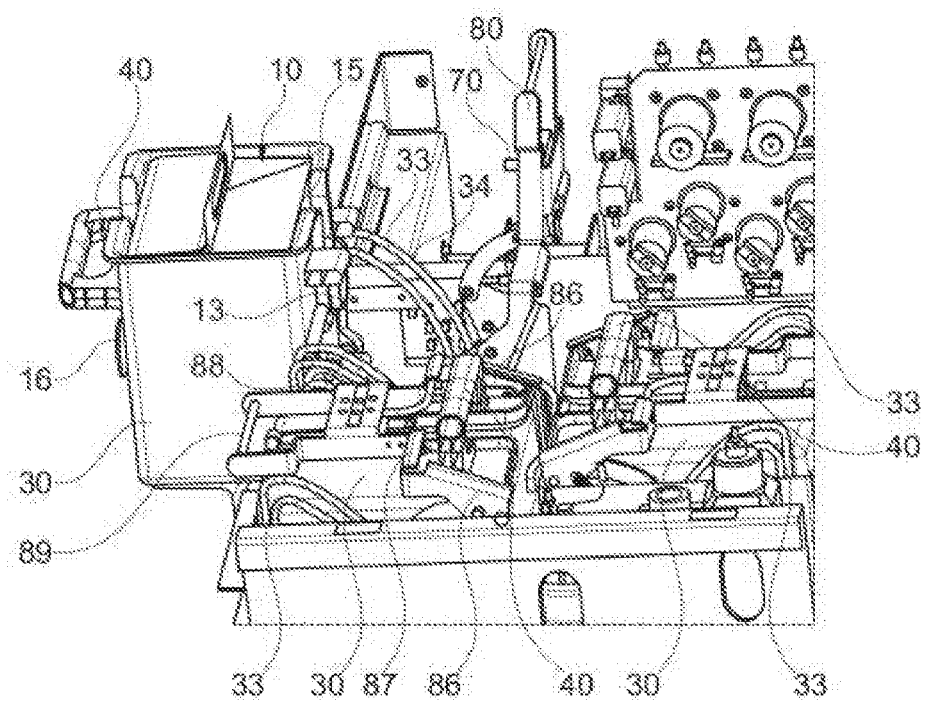

| | | | | |
|---|---|---|---|---|
| 5,199,594 | A * | 4/1993 | Obara | B65D 31/12 |
| | | | | 229/117.3 |
| 5,665,315 | A | 9/1997 | Jean-Edouard et al. | |
| 8,387,817 | B1 * | 3/2013 | Zelechonok | B65D 77/065 |
| | | | | 137/259 |
| 2007/0086923 | A1 * | 4/2007 | Li | G01N 35/1002 |
| | | | | 422/400 |
| 2014/0050622 | A1 * | 2/2014 | Kitagawa | G01N 35/00732 |
| | | | | 422/73 |

FOREIGN PATENT DOCUMENTS

| | | |
|---|---|---|
| JP | 2005-274153 A | 10/2005 |
| JP | 2016-211948 A | 12/2016 |

OTHER PUBLICATIONS

Office action for corresponding Japanese Application No. 2018-138252 dated Mar. 18, 2022, 7 pages.

* cited by examiner

DOUBLE BAG FOR AUTOMATED ANALYSIS DEVICE

The present invention relates to automated analysis devices and associated consumables.

For the purpose of rinsing the needles serving to collect samples of reagents or specimens, some automated devices use a rinsing liquid contained in a first reservoir, which has to be changed regularly.

After use, this liquid is conveyed to a second reservoir, which has to be replaced at the same rate as the first one.

The first and second reservoirs are in the form of cans which are received, for example, in a drawer mounted slidably on the automated device. Replacement of the cans gives rise to numerous manipulations, which complicate the use of the automated device.

The application EP 0 697 248 A1 describes an automated device in which reagents are contained in flexible bags arranged in a housing. This application does not address the problems associated with the use of a rinsing liquid in an automated device.

There is a need to further perfect the automated analysis devices in order to simplify their use and in particular to afford a solution to the problem of applying a new consumable and removing the used consumable.

The invention responds in particular to this need by making available a double bag having a first compartment containing a composition to be distributed and a second compartment for receiving a used fluid, a first bag connector communicating with the first compartment and serving to empty the latter, and a second bag connector communicating with the second compartment and serving to fill the latter.

Preferably, the first and second compartments are integrally joined to each other by manufacture of the bag.

A bag of this kind affords an elegant solution to the aforementioned problem by reducing the number of manipulations that have to be performed in order to ensure the functioning of the automated device. The one or more bags may be placed in the apparatus while full of fresh washing liquid and may be removed when they no longer contain fresh washing liquid but are full of used washing liquid. The bag may maintain a substantially constant volume in the apparatus, by virtue of the liquid contained in one compartment being transferred to the other compartment as the bag is used by the apparatus.

The risk of an error during the manipulation of the fluids is likewise reduced.

The first connector may be oriented downward when the bag rests horizontally flat with the second compartment above the first. The second connector may be oriented upward when the bag rests horizontally flat with the second compartment above the first. This horizontal functioning is optimal, since it facilitates the emptying of the first compartment by the weight of the liquid arriving in the second compartment. This reduces the risk of dead volume.

The first and second connectors are preferably equipped with valves which ensure a leaktight closure of the bag before it is placed on the apparatus and after it is removed.

The first compartment and second compartment may be separated by at least one flexible wall, for example by a double wall formed by the respective envelopes of the two compartments.

The bag may have a handle formed in the continuation of the compartments. The compartments may be formed by the joining together of flexible films, and the handle may be produced by a cutout in an end band formed by flat superpositioning of said films.

Preferably, the first bag connector and the second bag connector are arranged differently on the respective faces of the bag. This makes it possible to provide an error-proofing feature requiring that the bag is placed with a predefined orientation in the apparatus.

The composition to be distributed may be a detergent, but the invention applies in particular to all cases where a new consumable has to be supplied and this consumable has to be recovered after use.

Preferably, the second compartment contains a compound for causing said composition to thicken when the latter is brought into contact therewith, in particular a superabsorbent.

The invention further relates, according to another of its aspects, to an analysis apparatus having at least one bin for receiving a double bag according to the invention, as defined above.

The bin may be movable between a raised position for introduction or removal of the bag and a horizontal position of use by the apparatus.

The apparatus may comprise a connector arranged relative to the bin in such a way that the displacement of the bin from its raised position to its position of use causes the first bag connector to cooperate with the connector of the apparatus. The displacement of the bin may in particular be guided by rails in such a way that the movement of the bin between its raised position and its position of use includes a rotational component and a component of translation. In particular, the guiding may be effected in such a way as to impose a movement of vertical translation of the bin as it approaches the connector of the apparatus and during engagement in said connector. The rails may ensure that the bin is kept stable in the vertical position.

The apparatus may comprise a lever carrying a second apparatus connector, the lever being movable between a standby position and an active position in which the second apparatus connector cooperates with the second bag connector. The lever may be actuated by the operator tilting the bin containing the bag. The lever may be articulated by means of two link rods, and at least one return spring may be provided in order to ensure stability of the folded-down and raised positions. The stability in the folded-down position is useful for reducing the risk of leaks at the connection to the bag.

The bag may be received in a drawer of the apparatus. The bin may be carried by this drawer. Preferably, the apparatus has at least two bins, better still at least three bins.

The apparatus may have a fluid circuit with a first bag selection valve connected at the inlet to the first connectors of at least two bags, and a second bag selection valve connected to the second connectors of these bags, and a control system for controlling the functioning of the valves in such a way as to switch automatically, when the first compartment of the bag from which removal is carried out is empty, to the bag whose first compartment is full.

The fluid circuit may comprise a buffer reservoir supplied via an outlet of the first valve, a level gauge and a pump for carrying out the removal from the first compartment selected, the functioning of the pump being governed by a signal delivered by the level gauge, in such a way that consumption, by the apparatus, of the content of the buffer reservoir causes the latter to fill with composition removed by the pump from the first compartment of the bag selected by the first valve, the control circuit being arranged to detect a filling error of the buffer reservoir and to trigger the switching of the valve to the other bag in this case.

Preferably, the connection between the second apparatus connector and the second bag connector permits ventilation of the interior of the second compartment.

The bin may have openings in which there engage the connectors of the bag that is received in the inside. The connectors may be arranged to be blocked along their axis in the corresponding opening. The latter may have an edge which engages in a groove formed on the connector or between the connector and the wall of the bag to which it is attached.

The invention further relates to the analysis apparatus independently of the presence of double bags as defined above. Such an apparatus has at least one movable bin as defined above and may have all of the features mentioned above.

The invention further relates to a used double bag obtained after use of the bag according to the invention as defined above, in particular within an apparatus according to the invention as defined above, where the first compartment having contained the composition to be distributed is empty, and the second compartment contains this composition after use by the apparatus.

The invention further relates, according to another of its aspects, to a method for producing a double bag according to the invention, said method comprising the steps of producing two envelopes in a continuation of each other, which are connected by a portion that defines a fold line, folding one of the envelopes over onto the other and thereby assembling them.

Figure 4:
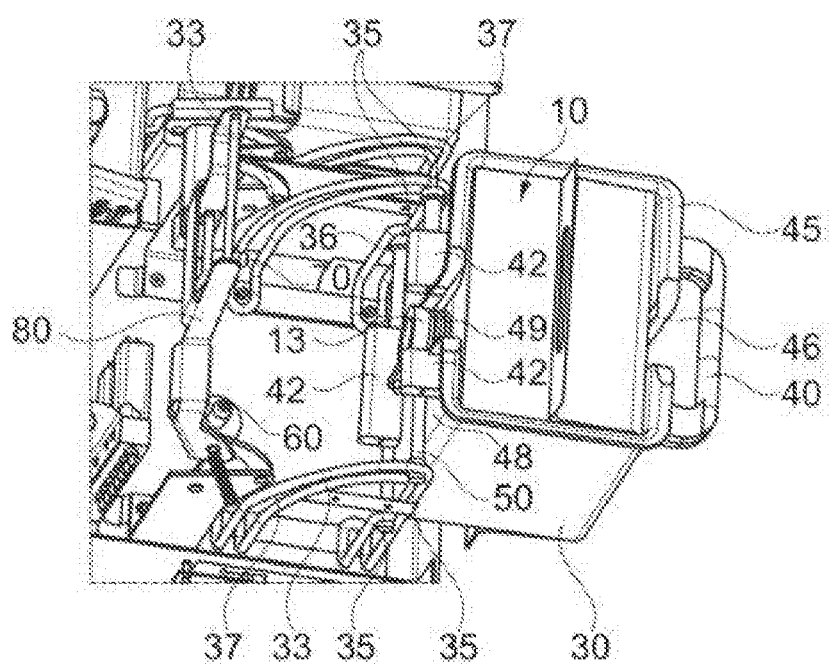
Figure 5:
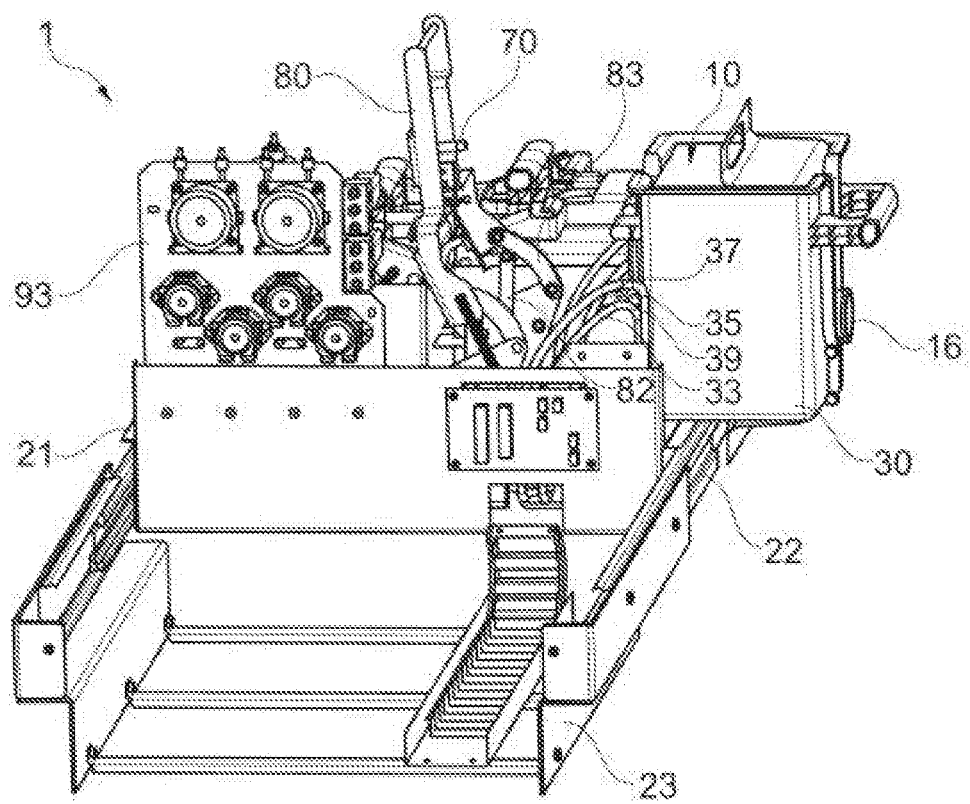
Figure 6:
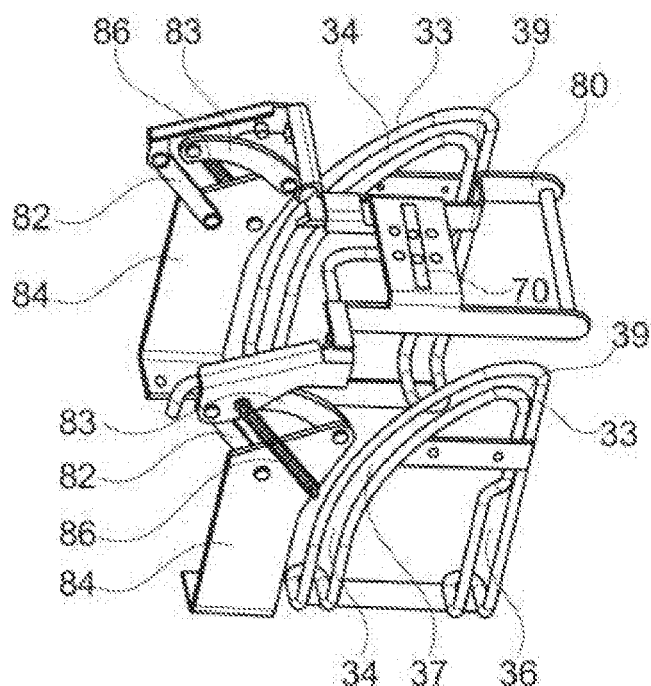
Figure 7:
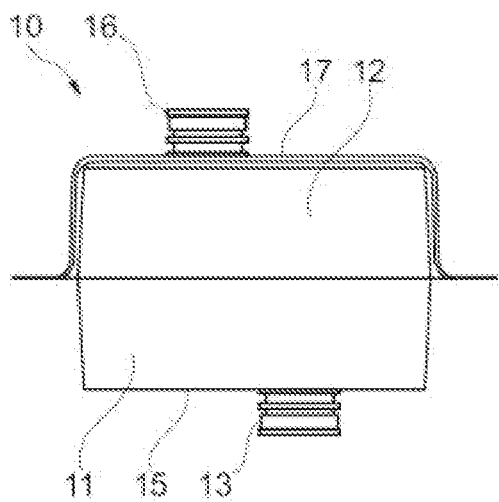
Figure 8:
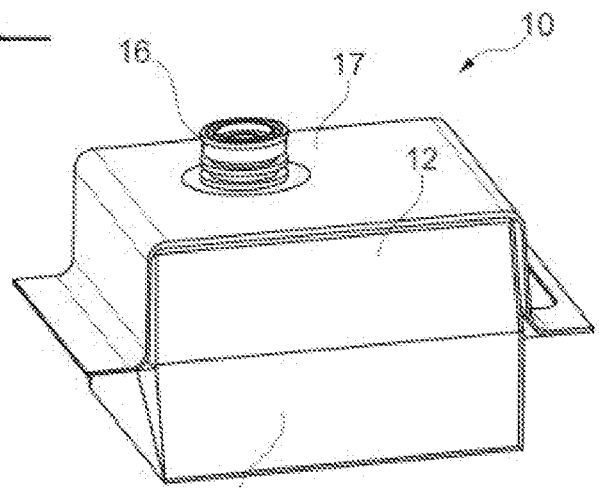
Figure 13:
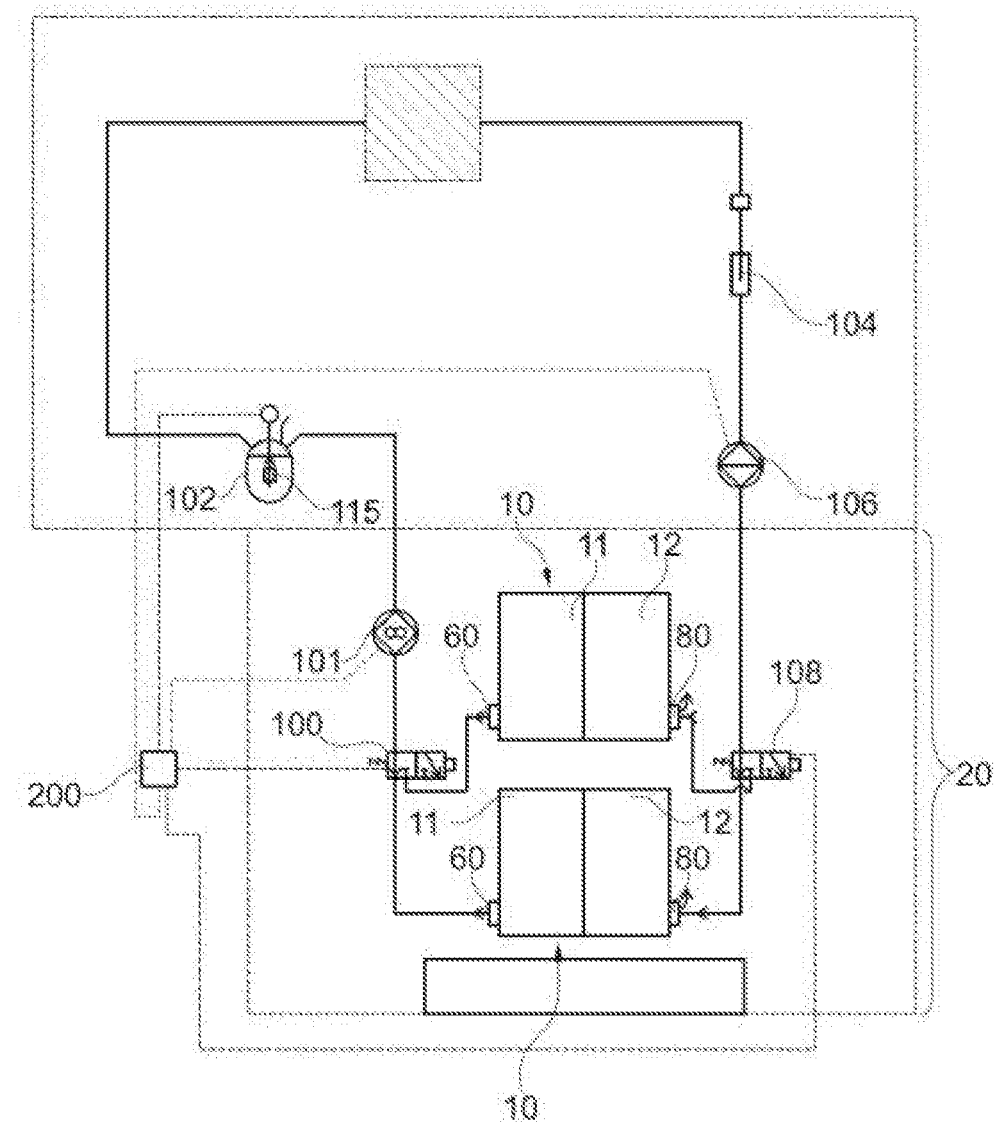

The invention will be better understood on reading the following detailed description of a non-limiting illustrative embodiment thereof, with reference to the attached drawing in which:

FIG. 1 shows a schematic and partial perspective view of an example of an analysis apparatus according to the invention, FIGS. 2 to 5 show details of the apparatus from FIG. 1, FIG. 6 shows, in isolation, guide rails for a bin and an associated locking lever, FIGS. 7 and 8 each show an example of a bag, FIGS. 9 to 12 illustrate the production of the bag, and FIG. 13 shows a schematic representation of an example of a fluid circuit of the apparatus, arranged to permit emptying of one compartment of the bag and filling of the other.

The analysis apparatus 1 shown partially in FIG. 1 has, in a manner known per se, a sample analysis system (not shown). This analysis system has a sampling tool designed to collect a sample of the liquid to be analyzed from suitable containers.

These are, for example, blood samples. The apparatus 1 is also called an automated analysis device.

The sampling tool comprises a needle, which has to be cleaned between each sampling procedure.

The analysis is carried out in the presence of reagents, which are themselves collected with the aid of one or more needles of the sampling tool, which has to be cleaned between the sampling procedures.

This cleaning is carried out with the aid of a cleaning liquid, which is contaminated during the operation of cleaning the sampling tool and has to be stored in the apparatus pending its elimination. The cleaning liquid is, for example, a detergent containing at least one surfactant.

The cleaning liquid is present initially in a container which, according to the invention, is in the form of a double bag 10, as is illustrated in FIGS. 7 and 8 in particular.

This bag 10 has a first compartment 11 containing the cleaning liquid and a second compartment 12 for receiving the used cleaning liquid.

The second compartment 12 may contain an agent for thickening the used liquid, for example a superabsorbent, so as to reduce the risk of liquid leaking out during transport of the bag, and optionally also a biocidal agent.

The bag 10 is produced with a first connector 13, which protrudes from a first main face 15 of the bag and communicates with the first compartment 11, and with a second connector 16, which protrudes from a second main face 17 of the bag 10, opposite the first one 15, and which communicates with the second compartment 12.

The analysis apparatus 1 has a drawer 20 for receiving several identical bags 10, although the invention is not limited to a drawer for multiple identical bags and may be applied to a drawer for a single bag or for bags of different sizes.

Moreover, although it is advantageous that the space for receiving the one or more bags 10 is in the form of a drawer, the invention also applies to a receiving space of a different configuration, for example one that is accessed by displacement of a lid, for example by raising the lid, or by opening a hatch, for example a front hatch or side hatch.

In the example illustrated, the drawer 20 receives three bags 10, being arranged to ensure functioning on at least one bag 10 while another one may be changed, by virtue of the fluid circuit described below.

The drawer 20 comprises a tray 21 supported by slides 22 which are mounted on a frame 23 formed integrally with the body of the apparatus 1.

The tray 21 may slide horizontally between a retracted position, in which it is situated inside the frame 23, and a deployed position, illustrated in FIG. 1, in which it permits access to the bags 10 for the purpose of their replacement.

The drawer 20 is preferably mounted in such a way as to open at the side of the apparatus 1.

The bags 10 are each received in a corresponding bin 30, which is movable relative to the tray 21 between a raised position for replacement of the bag 10, in which position it is open to the top, and a lowered position for use of the bag 10.

In the example in FIG. 1, one of the bins 30 is shown in the raised position and the other two in the lowered position.

The movement of each bin 30 between the raised position and lowered position is guided by a guide mechanism comprising two lateral rails 33 which define paths 34 in which rollers 35 circulate, said rollers 35 being carried by the bin 30.

The rollers 35 are arranged in pairs in each rail 33 and turn about axes of rotation parallel to each other.

Each rail 33 has a first portion 36, which is vertical, and an inwardly curved second portion 37, which is vertical in the lower part and curves inward to approach the first portion.

In the raised position of the bin 30, its rollers 35 are situated at the top of the inwardly curved second portion 37 and the first portion 36, as will be seen in FIG. 4 in particular. The rails 33 ensure that the bin 30 is held in a stable manner in the raised position, on account of the upper rollers 35 being blocked in the bend 39 formed by the rails 33, as may be seen in FIG. 5.

When the bin 30 is tilted to the lowered position, the rollers 35 previously situated in the first portion 36 are guided vertically downward, while the rollers 35 previously situated at the top of the second portion 37 descend into the latter.

Each rail 33 is formed, for example, by two parallel metal rods.

Each bin 30 has a handle 40 allowing it to be maneuvered between the raised position and lowered position. This handle 40 is directed upward when the bin 30 is in the lowered position.

At the side opposite the handle 40, the bin 30 has feet 42 which bear against the bottom of the tray 21 when the bin 30 is in the lowered position.

The wall 45 of the bin 30, on which the handle 40 is attached, has an opening 46 permitting the passage of the second connector 16 when the bag 10 is inserted into this bin.

The same applies to the opposite wall 48, as illustrated in FIG. 4, which has an opening 49 for the passage of the first connector 13.

The connectors 13 and 16 may be arranged to be blocked along their axis in the corresponding opening. The latter may have an edge which engages in a groove formed on the connector or, alternatively, between the connector and the wall of the bag to which it is attached.

In the example illustrated, each bin 30 has a substantially rectangular cross section, of which the large sides correspond to the walls 45 and 48.

The rollers 35 are carried by cylindrical guides 50 protruding from the wall 48.

Figure 3:
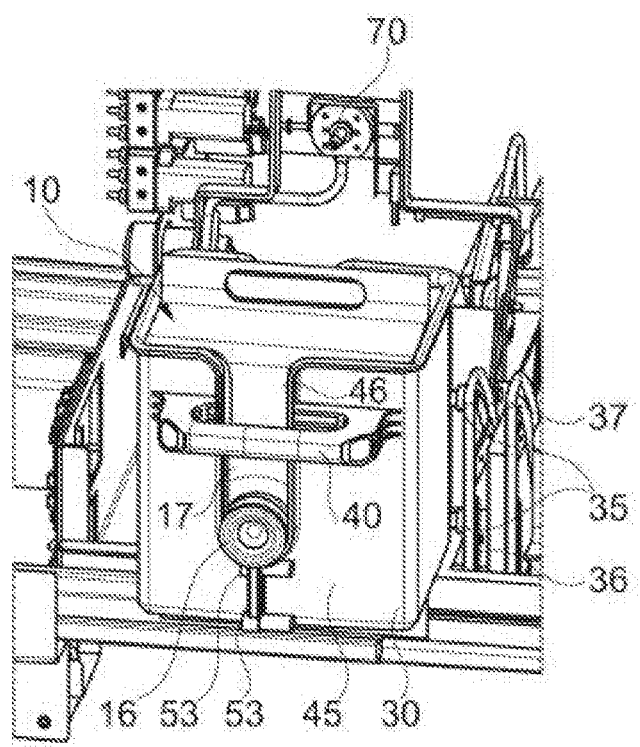

In the example in question, the bins 30 are produced by molding of thermoplastic material, in one or more assembled parts, for example in two shells assembled by screws 53, some of which may be seen in FIG. 3 in particular. In this example, the two halves of a bin are substantially symmetrical to each other with respect to a plane of symmetry, which is a median plane for the openings 46 and 49.

When the bag 10 is in the lowered position, the first connector 13 is oriented downward and the second connector 16 upward.

A male connector 60 associated with each bin 30 is arranged in the bottom of the tray 21 in such a way as to cooperate with the first connector 13, when the bin 30 is in a lowered position, and to be able to remove the liquid contained in the first compartment 11.

The first connector 13 is of the female type, known per se, closed when the male connector 60 is not engaged inside it.

The connection to the second connector 16, when the bin 30 is in the lowered position, is effected with the aid of a male connector 70 carried by a locking lever 80, which is visible in particular in FIG. 6 in the locking position and in FIG. 5 in the unlocked, raised position.

The lever 80 is articulated, with the aid of two link rods 82 and 83 arranged on each side of the lever 80, on fixed, vertical and parallel struts 84. A return spring 86 is mounted between each strut 84 and the lever 80 in order to ensure that the lever 80 is kept stable in the raised position and in the lowered position. The spring 86 is fastened at points which guarantee its passage through a state of maximum traction between the lowered and raised positions of the lever 80.

The lever 80 has two branches 86, each having an outwardly directed bend 87. It thus has a widened base which allows it, in the lowered position, to engage on each side of the handle 40, as may be seen in FIG. 2 in particular.

The two branches 86 are connected by a plate 88 which serves to fix the male connector 70 and, at the end, by a handle 89 which is used to maneuver it.

The lever 80 carries an electrical switch (not visible) by which it is possible to detect the presence of the second connector 16 when the lever 80 is folded down. The connector 16 is closed when the connector 70 is not engaged inside. The apparatus 1 is configured to prohibit the return of used fluid through the connector 70 in the absence of a bag 10. In this case, an alarm may be generated for the attention of an operator.

A set of components such as pumps is fixed to a strut 93 of the tray 21 in order to ensure the circulation of the fluids between the bags and the apparatus 1. To make the drawing clearer, the hoses connected to these components and joined to the connectors 60 and 70 are not shown.

FIG. 13 shows an example of a fluid circuit involving two bags 10. The functioning of this fluid circuit is ensured by a control circuit 200 such as an electronic board comprising a microcontroller or a microprocessor, for example.

The connectors 60 are connected to a valve 100 controlled by the control circuit, making it possible to select the bag 10 from which the washing liquid is collected.

A pump 101, for example a peristaltic pump, aspirates the washing liquid in the selected bag 10 and delivers it to a buffer reservoir 102 equipped with a level gauge 115. The functioning of the pump 101 is governed by the control circuit 200 to the level given by the gauge 115, in such a way as to keep said level constant.

The washing liquid is used in the apparatus 1 to rinse a needle of a sampling tool 104, shown schematically.

The used washing liquid is collected and conveyed by a pump 106 toward the second compartment 12 of the bag 10 from which the washing liquid was collected, by virtue of a selection made by a valve 108 controlled by the control circuit 200.

Ventilation is provided at the connection between the connectors 16 and 70, in such a way as to allow the air contained in the second compartment 12 to escape as said second compartment 12 is being filled.

The weight of the used rinsing liquid accumulating in the second compartment 12 places pressure on the fresh rinsing liquid contained in the first compartment, which makes it easier to empty the bag.

Thus, as the first compartment 11 of a selected bag 10 empties, the second compartment 12 fills correspondingly.

When the first compartment 11 is empty, the level in the buffer reservoir 102 drops below a certain threshold which is not normally reached on account of the control. This drop is detected by the control circuit 200 and causes a change of position of the valves 100 and 108 and the selection of a new bag 10, of which the first compartment 11 is full and the second compartment 12 empty.

An alarm may be generated by the control circuit 200 for the attention of an operator, prompting the latter to replace the used bag 10 with a new one.

The fluid circuit illustrated in FIG. 13 uses two bags 10 only. It may be extended to more than two bags.

There are various possible ways of producing the bags 10.

Figure 9:
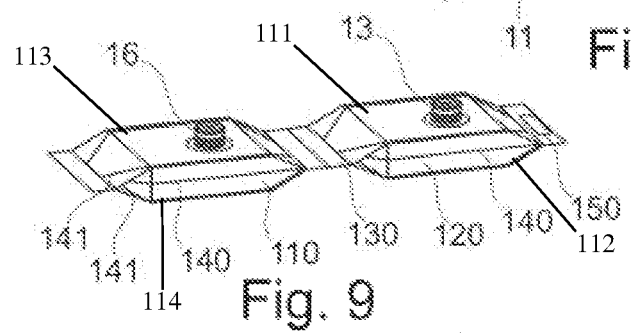
Figure 10:
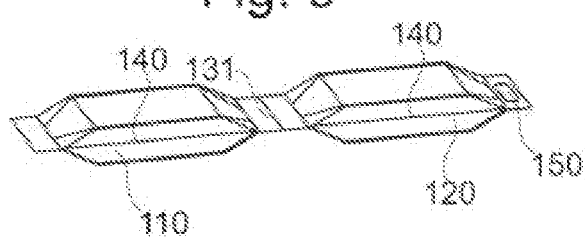
Figure 12:
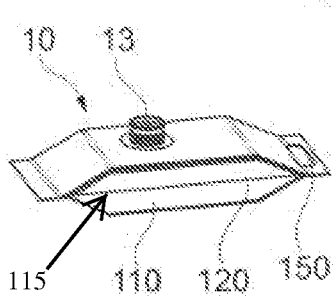

Preferably, the procedure illustrated in FIGS. 9 to 12 is followed, in which flexible films of thermoplastic material are joined together and cut in order to produce a continuous series of envelopes, two successive envelopes 110 and 120 of this series being intended to form the compartments 11 and 12, respectively, of a bag 10. These envelopes 110 and 120 are identical and have their connectors 13 and 16 situated on the same side, as is illustrated in FIGS. 9 and 10. For example, the first compartment 11 is formed between a first flexible film 111 on a side of the first bag connector 13 and a second flexible film on an opposite side of the first bag connector 13. Further, the second compartment 12 is formed between a third flexible film 113 on a side of the second bag connector 16 and a fourth flexible film 114 on an opposite side of the second bag connector 16. The second and fourth flexible films 112, 114 facing each other and forming a double flexible wall 115 separating the first and second compartments 11, 12.

Figure 11:
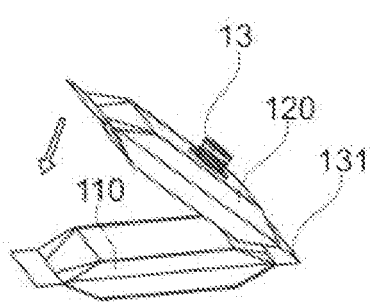

The envelopes 110 and 120 are connected by a joining portion 130 which defines a fold line 131, allowing one of the envelopes to be folded over onto the other one, as is illustrated in FIG. 11.

The envelopes 110 and 120 may be joined together via their contact faces, for example by adhesive bonding or welding.

The envelopes 110 and 120 may be produced with a handle 150 as illustrated, with which it is possible to maneuver the bag 10 outside the bins 30.

This handle 150 may receive a reinforcement, if appropriate.

Each envelope 110 or 120 is preferably produced with a gusset, of which the longitudinal folds 140 are directed toward the inside of the bag when the latter is empty and flat. Oblique joining lines 141 are formed by welding in the corners.

Of course, the invention is not limited to the example that has just been described.

In particular, the bins 30 may be produced differently, for example from metal with the aid of welded wires.

The bags may be produced differently. For example, the envelopes intended to form the compartments may be co-extruded.

The envelopes may also be assembled prior to being placed in a bin with the aid of at least one attached holding member.

The invention claimed is:

1. An analysis apparatus comprising:
a sample analysis system comprising a sampling tool designed to collect samples of liquid to be analyzed and reagents;
at least two bins, each bin receiving a double bag, said double bag comprising:
a first compartment containing a composition to be distributed and a second compartment for receiving a used fluid, a first bag connector communicating with the first compartment and serving to empty the first compartment, and a second bag connector communicating with the second compartment and serving to fill the second compartment,
wherein the double bag comprises a handle formed in the continuation of the compartments,
wherein the compartments are formed by the joining together of flexible films and the handle is a cutout in an end band formed by flat superpositioning of said films,
wherein the first compartment is formed between a first flexible film on a side of the first bag connector and a second flexible film on an opposite side of the first bag connector and the second compartment is formed between a third flexible film on a side of the second bag connector and a fourth flexible film on an opposite side of the second bag connector, the second and fourth flexible films facing each other and forming a double flexible wall separating the first and second compartments,
wherein the weight of the used fluid accumulating in the second compartment places pressure on the composition contained in the first compartment;
a fluid circuit with a first bag selection valve connected at an inlet to the first bag connectors of at least two double bags, and a second bag selection valve connected to the second bag connectors of the at least two double bags; and
a control system for controlling the functioning of the first and second bag selection valves to switch automatically, when the first compartment of the double bag from which removal is carried out is empty among the at least two double bags, to the double bag whose first compartment is full among the at least two double bags,
wherein each bin is movable between a raised position for introduction or removal of the double bag and a horizontal position for use by the apparatus, wherein the displacement of the bin is guided by rails, the movement of the bin between its raised position and its position of use including a rotational component and a component of translation, each rail having a first portion, which is vertical, and an inwardly curved second portion, which is vertical in a lower part and curving inward to approach the first portion, the rotational movement of the bin being ensured by the inwardly curved second portion of the rail.

2. The analysis apparatus according to claim 1, the first bag connector being oriented downward when the double bag rests horizontally flat with the second compartment above the first.

3. The analysis apparatus according to claim 1, the second bag connector being oriented upward when the double bag rests horizontally flat with the second compartment above the first.

4. The analysis apparatus according to claim 1, the first bag connector and the second bag connector being arranged differently on the respective faces of the double bag.

5. The analysis apparatus according to claim 1, wherein the composition to be distributed is a detergent.

6. Analysis apparatus according to claim 1, wherein the second compartment contains a compound for causing the composition to thicken when the composition is brought into contact therewith.

7. The analysis apparatus according to claim 1, further comprising connectors arranged relative to the at least two bins, respectively, wherein displacement of each bin from its raised position to its position of use causes the first bag connector to cooperate with the connector arranged relative to said bin.

8. The analysis apparatus according to claim 1, further comprising a lever carrying a second apparatus connector, the lever being movable between a standby position and an active position in which the second apparatus connector cooperates with the second bag connector.

9. The analysis apparatus according to claim 1, wherein the double bag is received by a drawer.

10. A used double bag obtained after use of the analysis apparatus according to claim 1, wherein the first compartment having contained the composition to be distributed is empty, and the second compartment contains this composition after use by an apparatus.

11. A method for producing a double bag as defined in the analysis apparatus according to claim 1, said method comprising the steps of producing two envelopes in a continuation of each other, which are connected by a portion that defines a fold line, folding one of the envelopes over onto the other and thereby assembling them.

12. The analysis apparatus according to claim 1, wherein the fluid circuit comprises a buffer reservoir supplied via an outlet of the first valve, a level gauge and a pump for carrying out the removal from the first compartment selected, the functioning of the pump being governed by a signal delivered by the level gauge, the delivered signal enabling consumption, by the analysis apparatus, of the content of the buffer reservoir causes the buffer reservoir to fill with composition removed by the pump from the first compartment of the bag selected by the first valve, the control circuit being arranged to detect a filling error of the buffer reservoir and to trigger the switching of the valve to the other bag in this case.

\* \* \* \* \*